United States Patent
Tsukamura

(10) Patent No.: US 10,739,717 B2
(45) Date of Patent: Aug. 11, 2020

(54) IMAGE FORMING APPARATUS

(71) Applicant: Konica Minolta, Inc., Chiyoda-ku, Tokyo (JP)

(72) Inventor: Shinichi Tsukamura, Uenohara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/660,491

(22) Filed: Oct. 22, 2019

(65) Prior Publication Data
US 2020/0133187 A1     Apr. 30, 2020

(30) Foreign Application Priority Data

Oct. 29, 2018  (JP) ................. 2018-202398

(51) Int. Cl.
| | | |
|---|---|---|
| *G03G 15/01* | (2006.01) | |
| *G03G 15/00* | (2006.01) | |
| *H04N 1/62* | (2006.01) | |

(52) U.S. Cl.
CPC ......... *G03G 15/6585* (2013.01); *G03G 15/01* (2013.01); *H04N 1/62* (2013.01); *G03G 15/5029* (2013.01); *G03G 2215/0129* (2013.01)

(58) Field of Classification Search
CPC ........... G03G 15/6582; G03G 15/6585; G03G 15/01; G03G 15/5029; G03G 2215/0129; H04N 1/62
See application file for complete search history.

(56) References Cited

U.S. PATENT DOCUMENTS

| | | | | |
|---|---|---|---|---|
| 8,649,696 B2 * | 2/2014 | Takemura | .......... | G03G 15/0194 |
| | | | | 399/39 |
| 2020/0096890 A1 * | 3/2020 | Tominaga | .......... | G03G 15/5029 |

FOREIGN PATENT DOCUMENTS

| | | |
|---|---|---|
| JP | 2012-155029 A | 8/2012 |
| JP | 2015-206951 A | 11/2015 |

* cited by examiner

*Primary Examiner* — Hoang X Ngo
(74) *Attorney, Agent, or Firm* — Squire Patton Boggs (US) LLP

(57) ABSTRACT

There is provided an image forming apparatus that includes a color image former that forms a color image with a plurality of process color toners, a spot color image former that forms a spot color image with a spot color toner, a transfer unit that transfers the formed color image and the formed spot color image onto a recording material, a fixing unit that fixes the transferred color image and the transferred spot color image onto the recording material, and a hardware processor that selects a first mode or a second mode depending on whether or not a type of the recording material and an amount of toner to be attached onto the recording material satisfy a predetermined condition. The number of times of image transfer and fixation onto an identical surface of the recording material is two or more predetermined times in the first mode. The number of times of image transfer and fixation onto an identical surface of the recording material is less than the predetermined times in the second mode. When images are formed on both surfaces of the recording material, the predetermined condition differs between a first surface and a second surface of the recording material.

15 Claims, 7 Drawing Sheets

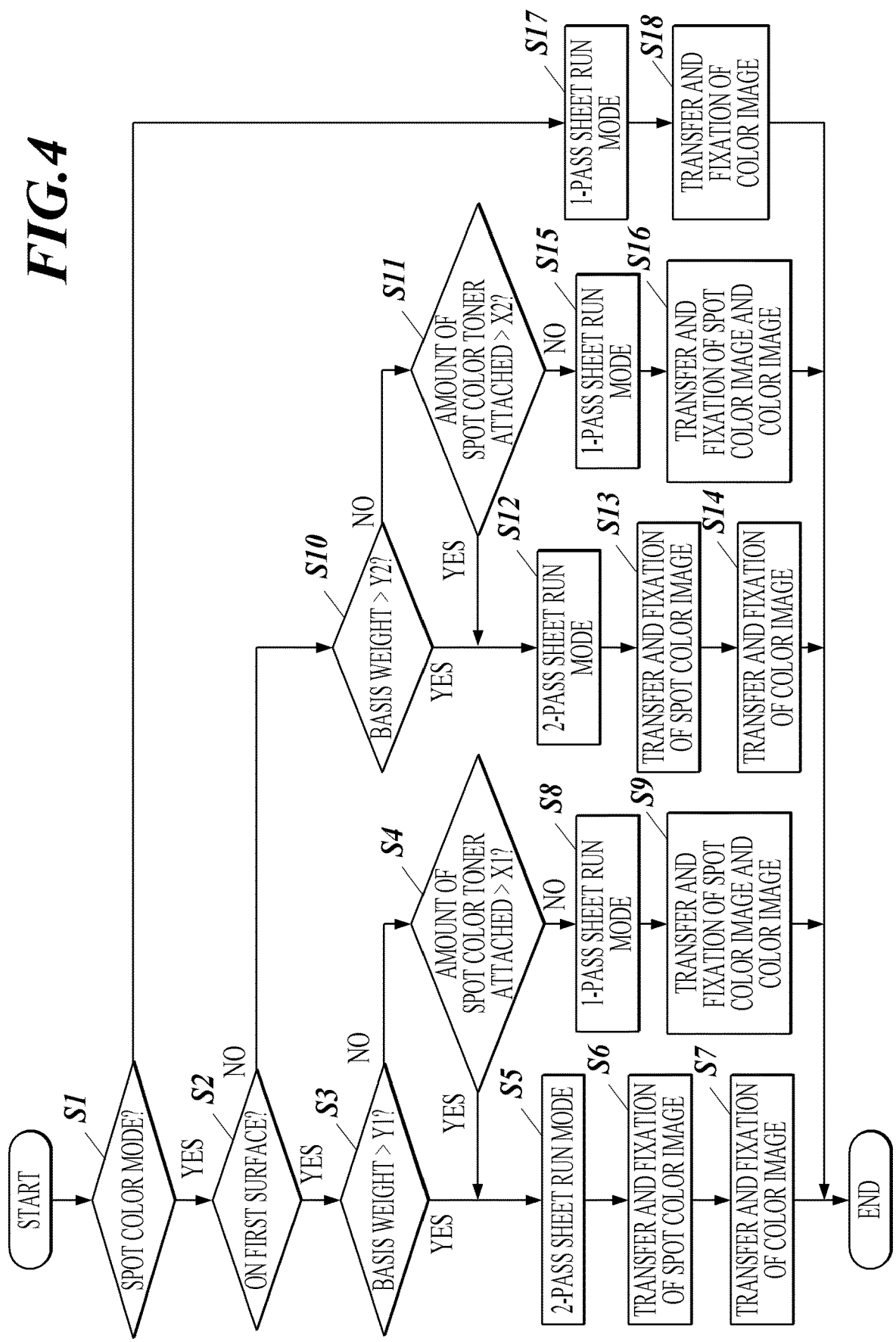

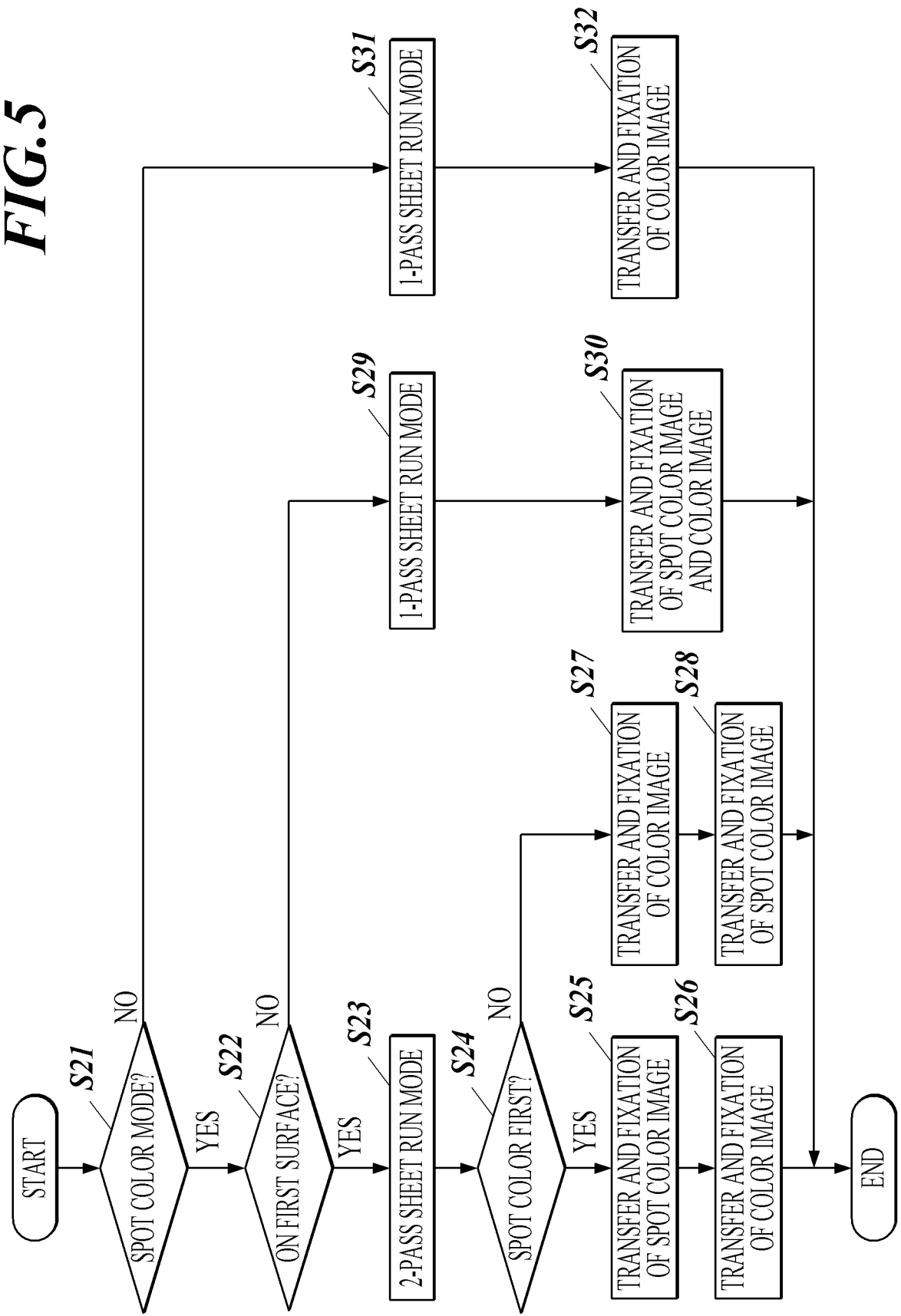

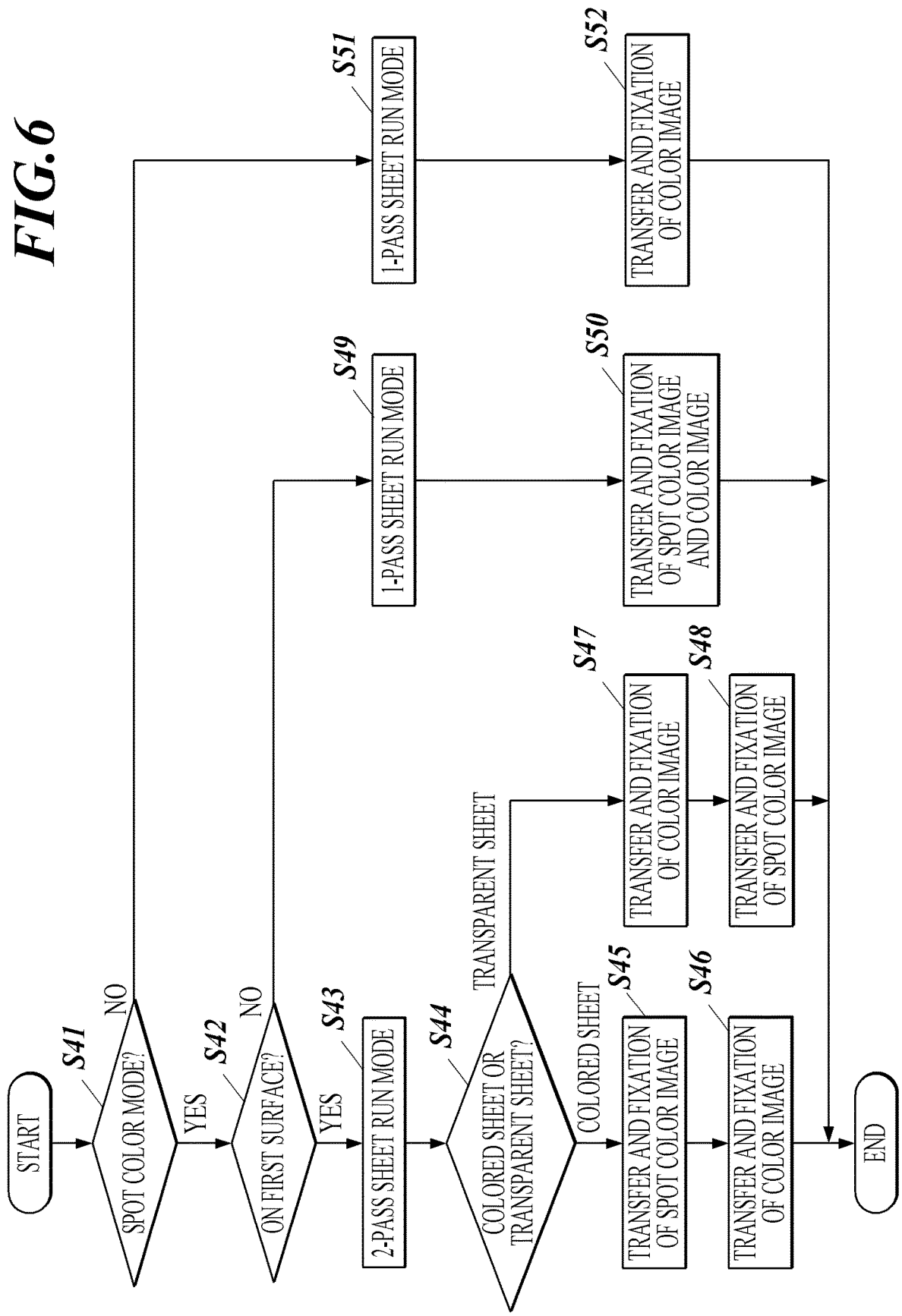

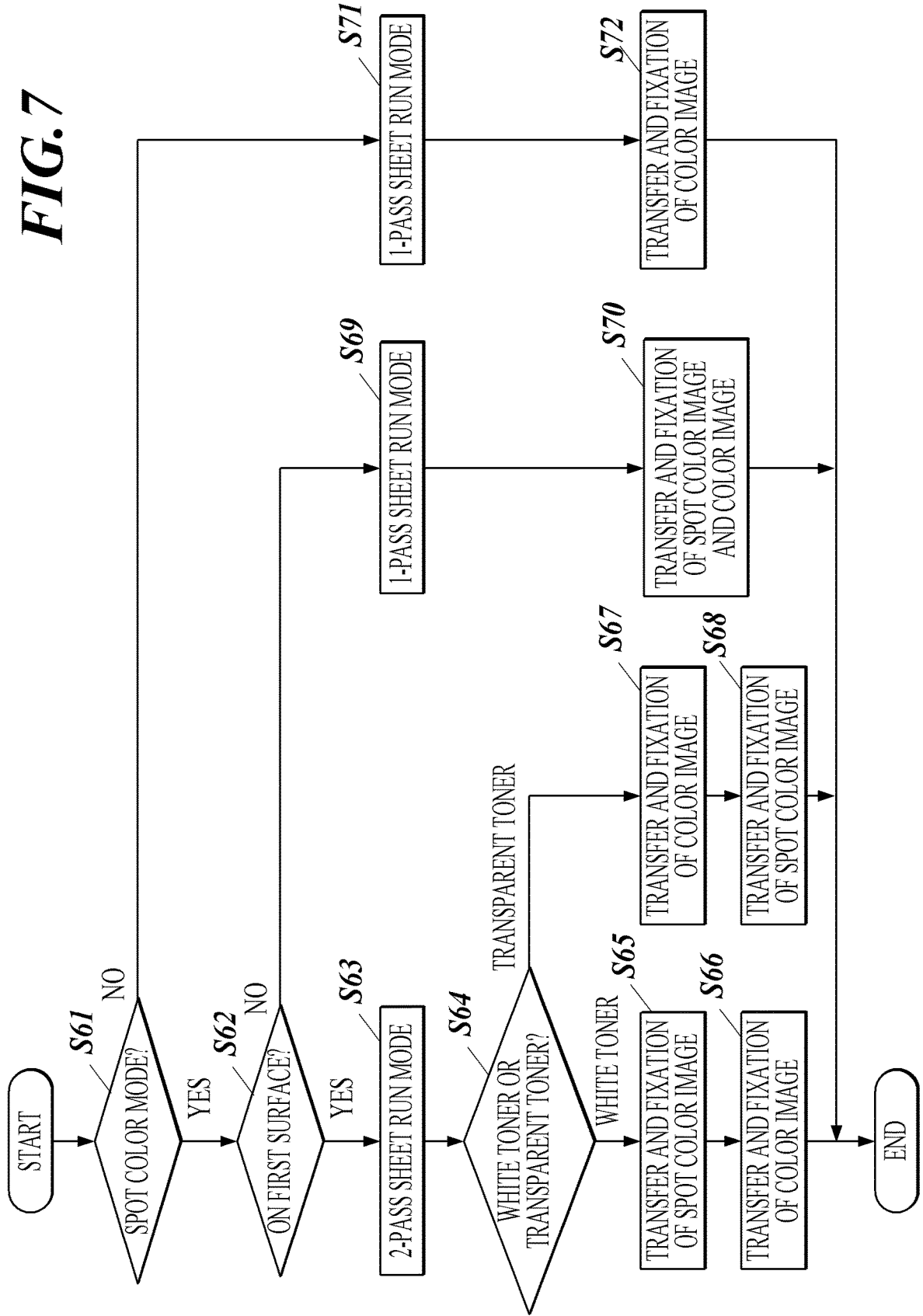

IMAGE FORMING APPARATUS

BACKGROUND

Technological Field

The present invention relates to an image forming apparatus.

Description of the Related Art

Conventionally, there have been known electrophotographic image forming apparatuses in which a spot color such as white and clear (transparent) can be used as well as process colors of yellow, magenta, cyan, and black. For example, in a case where a color image is formed on a colored sheet, the color of the colored sheet affects the color image. As a solution, there is known a technique to improve coloring of the color image by using white as a spot color and forming a white image layer under a color image layer. Here, it is necessary to apply a fairly large amount of white toner, which is primer for the color image, so that the color of the colored sheet should not affect the coloring.

In using a spot color in addition to the regular process colors, toner fixation failure is more likely to occur, since an increased amount of toner is attached to a recording material such as a sheet of paper. As a solution, there is disclosed an image forming apparatus in which transfer and fixation is done on the identical surface of the recording material twice in a high attachment amount mode (see Japanese Patent Application Laid-Open Publication No. 2015-206951 A).

For an image forming apparatus using colored toners and a transparent toner, there is used a mechanism of switching between a 1-pass image formation and a 2-pass image formation in accordance with the amount of toner of a colored toner image, in which fixation (heating/fusing) of colored toners and a transparent toner is done at once in the 1-pass image formation while fixation of a transparent toner is done after fixation of colored toners in the 2-pass image formation (see Japanese Patent Application Laid-Open Publication No. 2012-155029 A).

In the 2-pass image formation, since transfer and fixation onto the identical surface of the recording material is done twice, the amount of toner attached each time may be small, and thus the good fixity may be maintained However, two processes of image formation are required, which results in a decline in productivity. Moreover, it is disadvantageous in durability and in cost that the operating time of each unit of the image forming apparatus is extended.

In particular, in a case where an image is formed on both surfaces of a recording material and the 2-pass image formation is employed for both surfaces, the image formation (transfer and fixation) is done twice on each surface, four times in total. This results in a decline in productivity and makes the problem in durability and cost more significant.

SUMMARY

The present invention is conceived in view of the problems of the prior art described above, and an object thereof is to prevent a decline in productivity in duplex image formation using a spot color, while maintaining the image quality and the fixity.

To achieve at least one of the abovementioned objects, according to a first aspect of the present invention, the image forming apparatus reflecting one aspect of the present invention includes:

a color image former that forms a color image with a plurality of process color toners in different colors;

a spot color image former that forms a spot color image with a spot color toner in a spot color different from any of the colors of the plurality of process color toners;

a transfer unit that transfers the formed color image and the formed spot color image onto a recording material;

a fixing unit that fixes the transferred color image and the transferred spot color image onto the recording material; and a hardware processor that selects a first mode or a second mode depending on whether or not a type of the recording material and an amount of toner to be attached onto the recording material satisfy a predetermined condition, wherein the number of times of image transfer and fixation onto an identical surface of the recording material is two or more predetermined times in the first mode, wherein the number of times of image transfer and fixation onto an identical surface of the recording material is less than the predetermined times in the second mode, wherein when images are formed on both surfaces of the recording material, the predetermined condition differs between a first surface and a second surface of the recording material.

According to a second aspect of the present invention, the image forming apparatus reflecting one aspect of the present invention includes:

a color image former that forms a color image with a plurality of process color toners in different colors;

a spot color image former that forms a spot color image with a spot color toner in a spot color different from any of the colors of the plurality of process color toners;

a transfer unit that transfers the formed color image and the formed spot color image onto a recording material;

a fixing unit that fixes the transferred color image and the transferred spot color image onto the recording material; and a hardware processor that, when images are formed on both surfaces of the recording material, causes the spot color image and the color image to be transferred and fixed such that the number of times of image transfer and fixation onto a first surface of the recording material is two or more predetermined times, and that the number of times of image transfer and fixation onto a second surface of the recording material is less than the predetermined times.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 is a flow chart of the first image formation mode selection process executed by the image forming apparatus in the first embodiment.

FIG. 5 is a flow chart of the second image formation mode selection process executed by the image forming apparatus in the second embodiment.

FIG. 6 is a flow chart of the third image formation mode selection process executed by the image forming apparatus in the third embodiment.

FIG. 7 is a flow chart of the fourth image formation mode selection process executed by the image forming apparatus in the fourth embodiment.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Hereinafter, the first embodiment of the image forming apparatus according to the present invention is described with reference to the drawings. The present invention is not limited to the illustrated examples, though.

Figure 1:
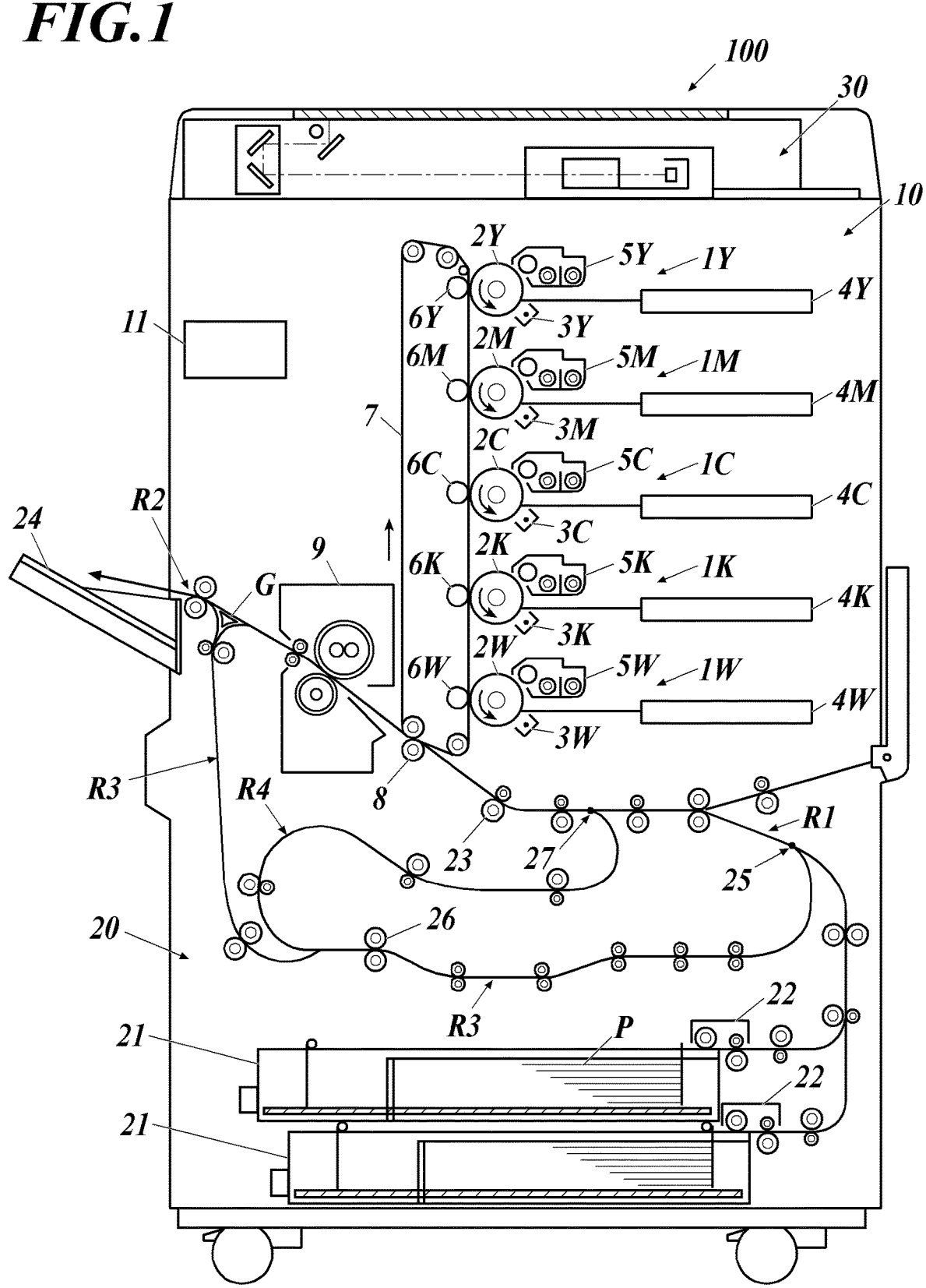
FIG. 1 shows a schematic configuration of the image forming apparatus in the first embodiment of the present invention.

FIG. 1 shows a schematic configuration of the image forming apparatus 100 in the first embodiment. The image forming apparatus 100 is a color image forming apparatus of the tandem-type to form full-color images in the electrographic method.

The image forming apparatus 100 includes a printer 10, a sheet conveyor 20, a document reader 30, a controller (hardware processor) 11, etc. stored in a single casing.

The printer 10 forms an image(s) on a sheet P as a recording material on the basis of image data. The printer 10 includes image formers of four regular colors (process colors) 1Y, 1M, 1C, and 1K, an image former of a spot color 1W, an intermediate transfer belt 7, a secondary transfer roller 8, a fixing unit 9, etc.

The image former 1Y forms an image in yellow (Y). The image former 1M forms an image in magenta (M). The image former 1C forms an image in cyan (C). The image former 1K forms an image in black (K). The image formers 1Y, 1M, 1C, and 1K are color image formers to form a color image with process color toners of plural colors (yellow, magenta, cyan, and black).

The image former 1W forms an image in white (W). The image former 1W is a spot color image former to form a spot color image with a toner of a spot color other than yellow, magenta, cyan, or black. In this embodiment, white is used as the spot color.

The image former 1Y includes a photosensitive drum 2Y, a charging unit 3Y, an exposure unit 4Y, a development unit 5Y, and a primary transfer roller 6Y. The charging unit 3Y electrically charges the surface of the photosensitive drum 2Y evenly. The exposure unit 4Y provides light scanning to the photosensitive drum 2Y to form an electrostatic latent image. The development unit 5Y put yellow toner on the electrostatic latent image on the photosensitive drum 2Y for development. The primary transfer roller 6Y transfers (primary transfer), on the intermediate transfer belt 7, the toner image in yellow formed on the photosensitive drum 2Y.

Similarly, the image formers 1M, 1C, 1K, and 1W respectively include photosensitive drums 2M, 2C, 2K, and 2W, charging units 3M, 3C, 3K, and 3W, exposure units 4M, 4C, 4K, and 4W, development units 5M, 5C, 5K, and 5W, and primary transfer rollers 6M, 6C, 6K, and 6W.

The image formers 1M, 1C, 1K, and 1W are configured similarly to the image former 1W, except that they use toners in different colors.

A toner image in one or more colors of yellow, magenta, cyan, black, and white is formed on the intermediate transfer belt 7 by the image formers 1Y, 1M, 1C, 1K, and 1W. Images in yellow, magenta, cyan, black, and white may be individually put on the intermediate transfer belt 7, or alternatively, images in all five colors may be layered.

The secondary transfer roller 8 transfers the toner image in colors formed on the intermediate transfer belt 7 onto the sheet P which is conveyed at a predetermined timing by the sheet conveyor 20. The secondary transfer roller 8 is a transfer unit to transfer the color image formed by the image formers 1Y, 1M, 1C, and 1K and the spot color image formed by the image former 1W onto the recording material. The secondary transfer roller 8 is pressed against the intermediate transfer belt 7 in contact therewith and forms a nip part (transfer nip part).

The fixing unit 9 heats and presses the toner image transferred onto the sheet P to fix the toner image onto the sheet P. That is, the fixing unit 9 fixes the color image and the spot color image transferred by the secondary transfer roller 8 onto the recording material.

The sheet conveyor 20 conveys the sheet P along the conveyance path of the sheet P.

The sheet conveyor 20 includes an image formation path R1 for conveyance of the sheet P to the printer 10, a switching gate G, a sheet ejection path R2 for ejection of the sheet P to the exterior after image formation, a loop path R3 for circulation of the sheet P after image formation, and an overturn path R4 for image formation on both surfaces of the sheet P.

Each conveyance path includes plural pairs of rollers to convey the sheet P. The rollers are pressed in contact to each other in each pair and are used to convey the sheet P by the driving mechanism such as an electrical motor to rotary drive at least either one of the rollers.

The image formation path R1 is a path for conveyance of the sheet P from the sheet feeding tray 21 to the switching gate G. The sheet P set in the sheet feeding tray 21 is taken in by the sheet feeder 22 and sent to the image formation path R1.

The printer 10 (the intermediate transfer belt 7 and the secondary transfer roller 8 as the transfer nip part, and the fixing unit 9, in particular) is disposed on the image formation path R1.

The sheet P is successively conveyed to run on the image formation path R1. The timing to convey the sheet P to the transfer nip part is adjusted at the position where the upstream edge of the sheet P hits the resistance roller 23.

When the resistance roller 23 starts to rotate in synchronization with the toner image retained by the intermediate transfer belt 7 at the predetermined timing, the sheet P is conveyed to the transfer nip part of the printer 10, and then conveyed to the fixing unit 9. The sheet P which has been undergone the fixation process at the fixing unit 9 is conveyed to the switching gate G.

The switching gate G is disposed on the downstream side relative to the fixing unit 9 in the sheet conveyance direction and switches the conveyance destination of the sheet P conveyed on the image formation path R1. Specifically, in a case where the sheet P, after passing through the fixing unit 9, is conveyed to the sheet ejection path R2, the switching gate G guides the sheet P straight. In a case where the sheet P, after passing through the fixing unit 9, is conveyed to the loop path R3 or the overturn path R4, the switching gate G guides the sheet P downward.

The sheet ejection path R2 is a conveyance path for ejection of the sheet P that has undergone the fixing process by the fixing unit 9 to a sheet ejection tray 24 attached on the lateral side of the exterior of the casing.

The loop path R3 is a conveyance path for return of the sheet P that has undergone the fixing process by the fixing unit 9 without changing the surface on which the image is formed (that is, without turning upside down) to the image formation path R1.

The loop path R3 is branched from the image formation path R1 on the downstream side relative to the printer 10 in the sheet conveyance path (at the position of the switching gate G) to reach the meeting point 25 disposed halfway on the image formation path R1. The sheet P fed on the loop path R3 passes through the reversing roller 26 disposed halfway on the loop path R3 and reaches the meeting point 25. The sheet P is sent to the image formation path R1 again after reaching the meeting point 25.

The overturn path R4 is a conveyance path for overturn of the sheet P that has undergone the fixing process by the fixing unit 9 and for return of the sheet P to the image formation path R1. The overturn path R4 is branched from the loop path R3 halfway (on the upstream side relative to the reversing roller 26 in the sheet conveyance direction) to reach the meeting point 27 disposed halfway on the image formation path R1.

In a case where the image is formed also on the back surface of the sheet P, the sheet P conveyed on the loop path R3 is sent by reversing of the reversing roller 26 at the timing when the reversing roller 26 holds the downstream end of the sheet P, and conveyed to the overturn path R4 to reach the meeting point 27 on the image formation path R1. The sheet P is sent to the image formation path R1 again after reaching the meeting point 27.

The document reader 30 provides light scanning of the image on a document and reads its reflected light by a line image sensor to obtain image signals. The document reader 30 performs A/D conversion, shading modification, compression, etc., on the image signals and outputs the obtained image data to the controller 11.

In the image forming apparatus 100, in a case where the color image is formed on a colored sheet as the sheet P, a white image layer is formed under a color image layer (between the sheet P and the color image layer) so that coloring of the color image is improved.

In the image forming apparatus 100, the spot image formation unit (image former 1W) is disposed on the downstream side relative to the color image formation units (image formers 1Y, 1M, 1C, and 1K) in the rotating direction of the intermediate transfer belt 7. The images in each color are layered on the intermediate transfer belt 7 by the image formation units 1Y, 1M, 1C, and 1W, and are integrally transferred on the sheet P from the intermediate transfer belt 7 to be fixed onto the sheet P afterwards (1-pass sheet run).

Alternatively, the color image may be formed on the identical surface of the sheet P in the following way (2-pass sheet run): The white image is formed on the intermediate transfer belt 7; the white image is transferred and fixed onto the sheet P from the intermediate transfer belt 7; the sheet P is then refed on the loop path R3. In the 2-pass sheet run, where the spot color image and the color image are formed separately, the operation of image former 1W is suspended when only the image in four colors is formed, and the pressure contact of the primary transfer roller 6W is released. In that case, an unnecessary action of the image former 1W may be prevented, and the durability may be improved. On the other hand, in a case where only the white image is formed, the operation of the image formers 1Y, 1M, 1C, and 1K is suspended.

Figure 2:
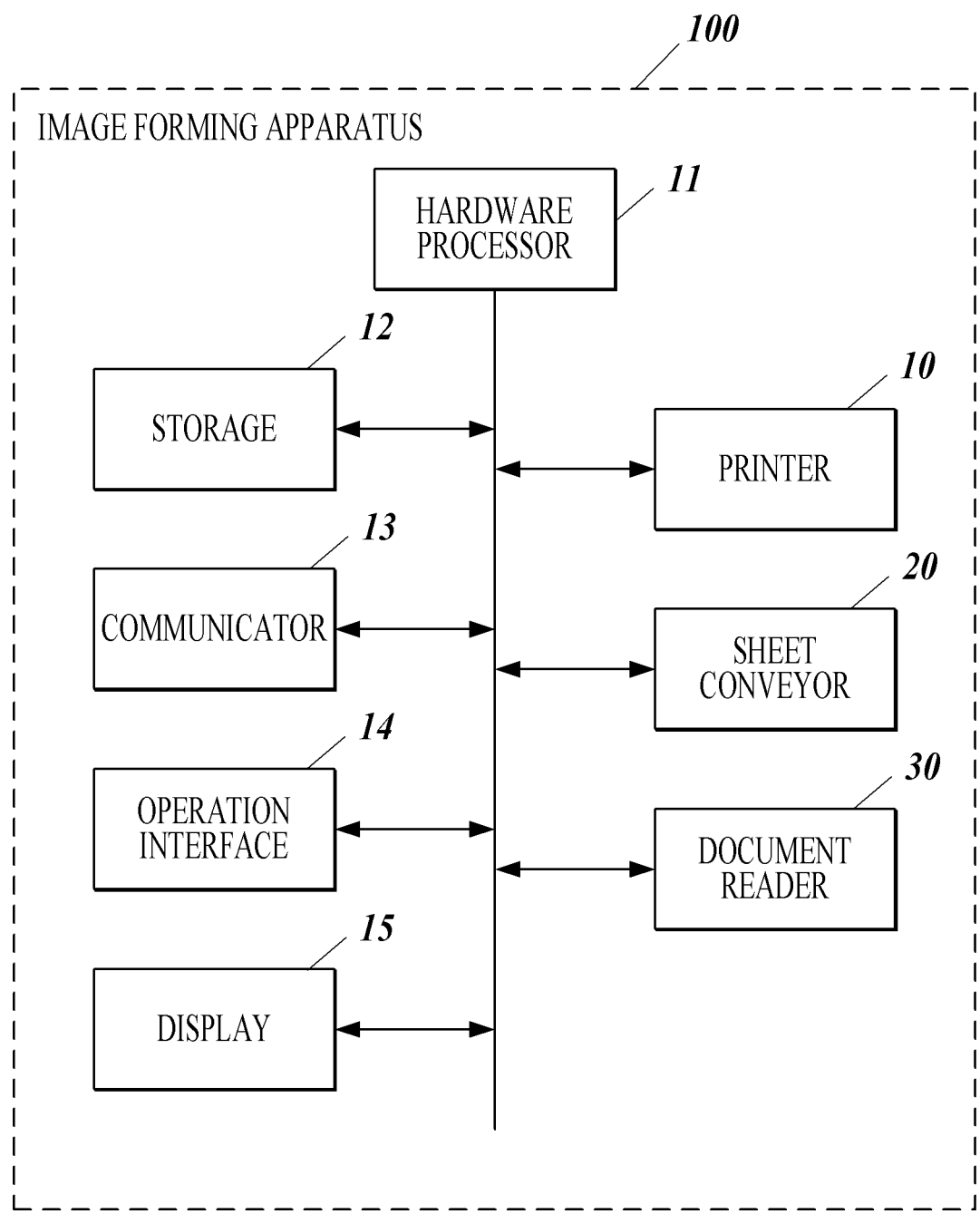
FIG. 2 is a block diagram showing a schematic configuration of a control system of the image forming apparatus.

FIG. 2 is a block diagram showing a schematic configuration of the control system of the image forming apparatus 100.

As shown in FIG. 2, the image forming apparatus 100 includes a controller 11, a storage 12, a communicator 13, an operation interface 14, a display 15, a printer 10, a sheet conveyor 20, a document reader 30, etc.

The controller 11 includes a CPU (Central Processing Unit), a RAM (Random Access Memory), etc. The CPU of the controller 11 reads out a system program and various kinds of programs stored in the storage 12, loads them in the RAM, and integrally controls the operation of the components of the image forming apparatus 100 according to the loaded programs.

For example, the controller 11 performs control to form the image on the sheet P according to the image data received from the communicator 13 or the image data obtained by the document reader 30.

The storage 12, which is configured as a non-volatile semiconductor memory, an HDD (Hard Disk Drive), or the like, stores parameters and data necessary for the components of the image forming apparatus 100, in addition to various kinds of the programs performed in the controller 11.

The communicator 13, which includes various kinds of interface such as NIC (Network Interface Card), MODEM (Modulator-DEModulartor), and a USB (Universal Serial Bus), connects with an external device(s) such as a personal computer, and sends and receives data to and from the external device(s). For example, the communicator 13 receives job information which includes a command to form an image from an external device. The job information includes image data of the target of image formation, and various kinds of setting data.

The operation interface 14 includes a touch panel which is formed to cover the display screen of the display 15, various operation buttons such as number buttons and a start button, and outputs operation signals according to the user operation to the controller 11.

The display 15, which is configured as an LCD (Liquid Crystal Display), displays various screens according to the command of display signals input by the controller 11.

Described below is the difference in the fixity between the first surface (onto which transfer and fixation is done first) and the second surface (onto which transfer and fixation is done later) of the sheet P when the image is formed on both surfaces.

Figure 3A:
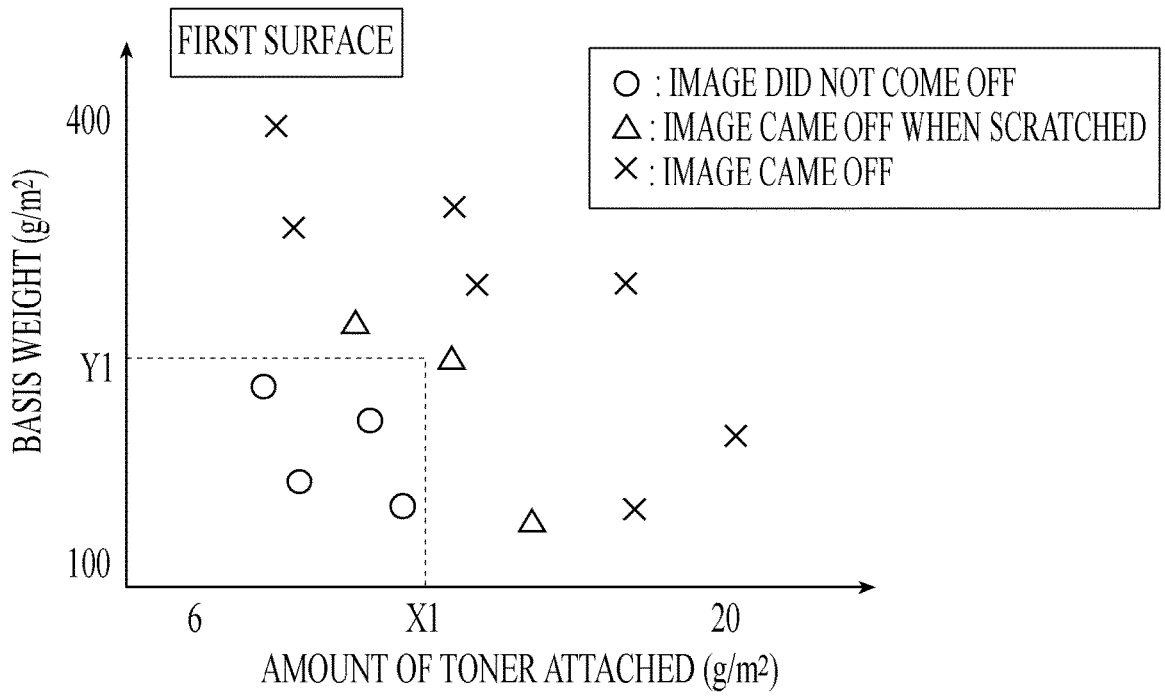
FIG. 3A shows results of evaluating the fixity on the first surface with variables of the amount of spot color toner attached and the basis weight in the image formation on both surfaces.
Figure 3B:
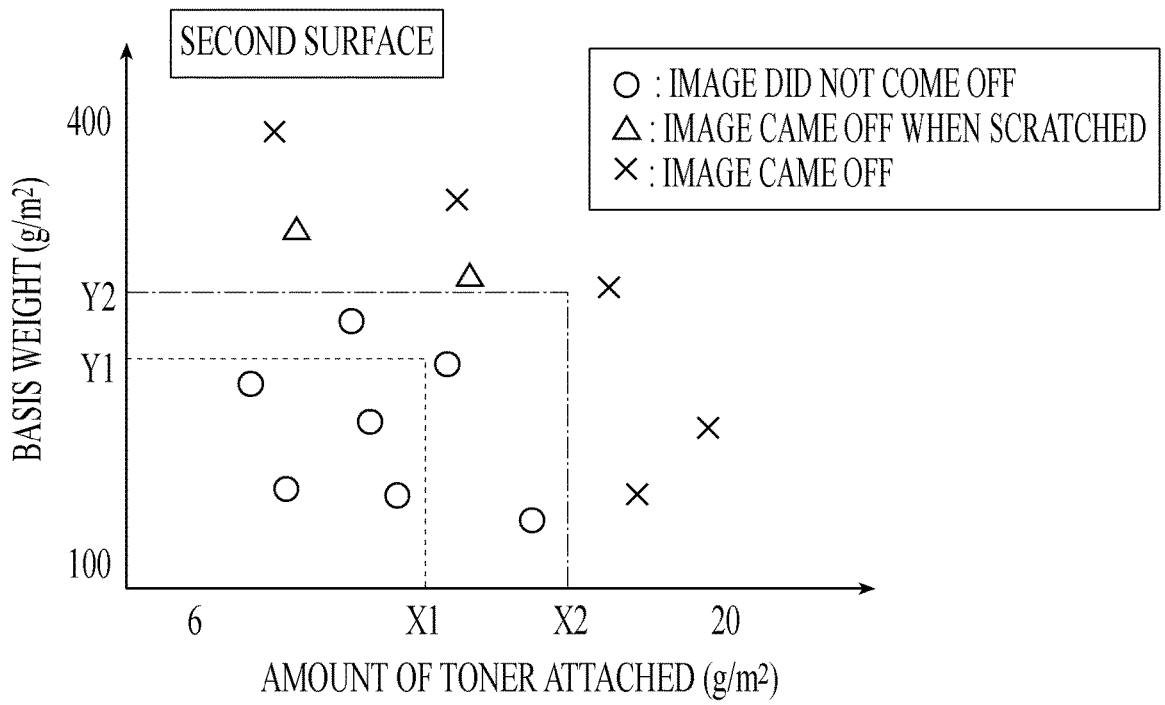
FIG. 3B shows results of evaluating the fixity on the second surface with variables of the amount of spot color toner attached and the basis weight in the image formation on both surfaces.

FIG. 3A shows results of evaluating the fixity on the first surface with variables of the amount of spot color toner attached (g/m2) and the basis weight (g/m2). FIG. 3B shows results of evaluating the fixity on the second surface with variables of the amount of spot color toner attached (g/m2) and the basis weight (g/m2). In FIGS. 3A and 3B, "O (circle)" indicates values where "the image did not come off," "Δ (triangle)" indicates values where "the image came off when scratched", and "X (cross)" indicates values where "the image came off."

As shown in FIG. 3A, for the first surface, the result "O (circle)" was obtained in the range where the amount of spot color toner attached was below X1 and the basis weight being was below Y1. It was shown that there was no problem in the fixity in that range.

For the first surface, the result "Δ (triangle)" or "X (cross)" was obtained, which means there was a fixation failure, where the amount of spot color toner attached was above X1 or the basis weight was above Y1. Thus, it is necessary to transfer and fix the image onto the first surface twice or more times where the amount of spot color toner attached is above X1 or the basis weight is above Y1.

On the other hand, as shown in FIG. 3B, for the second surface, the result "O (circle)" was obtained in the range where the amount of spot color toner attached was below X2 (X2>X1) and the basis weight was below Y2 (Y2>Y1). It was shown that there was no problem in the fixity in that range.

For the second surface, the result "Δ (triangle)" or "X (cross)" was obtained, which means there was a fixation failure, where the amount of spot color toner attached was above X2 or the basis weight was above Y2. Thus, it is necessary to transfer and fix the image onto the second surface twice or more times where the amount of spot color toner attached is above X2 or the basis weight is above Y2.

FIGS. 3A and 3B show the results of evaluating the fixity in a case where the spot color image and the color image were formed in superimposed layers, under presupposition that there is no fixation failure in a case where only the spot color image is formed even in the range where the results "Δ (triangle)" and "X (cross)" are obtained.

The fixity may vary depending on the type of the sheet P (basis weight, etc.) and the amount of toner attached. Thus, in some cases, the image may be fixed in the 1-pass sheet run with a good fixity, and in other cases, the fixity may be barely maintained in the 2-pass sheet run.

As the fixity varies between the first surface and the second surface, the range where the image can be fixed in the 1-pass sheet run also varies. Specifically, in the image formation of the spot color image and the color image, the range where the image can be fixed in the 1-pass sheet run is generally larger on the second surface than on the first surface.

The fixity varies on the first surface and on the second surface as described above, because, in the image formation on the second surface, the temperature of the sheet P has got higher by fixation (heating) onto the first surface and the fixity is better on the second surface than on the first surface (the image can be fixed with a greater amount of toner attached/the image can be fixed on a thicker sheet P).

The controller 11 selects either the first mode or the second mode depending on whether the type of the sheet P and the amount of toner attached on the sheet P satisfy a predetermined condition. In the first mode, the number of times of transfer and fixation onto the identical surface is two or more predetermined times. In the second mode, the number of times of transfer and fixation onto the identical surface is less than the two or more predetermined times. In this embodiment, the "predetermined times" is twice and the "number of times less than the predetermined times" is once, for example.

The predetermined condition is different between one surface and the other when the image is formed on both surfaces of the sheet P.

One of the two surfaces of the sheet P is defined as a surface onto which transfer and fixation is done first (the first surface) and the other surface of the sheet P is defined as a surface onto which transfer and fixation is done later (second surface).

The controller 11 selects the 2-pass sheet run mode (the first mode) in a case where the amount of toner attached is greater than a predetermined value, and selects the 1-pass sheet run mode (the second mode) in a case where the amount of toner attached is equal to or less than a predetermined value. The 2-pass sheet run mode is a method of running a sheet where transfer and fixation is done twice on the identical surface of the sheet P. The 1-pass pass sheet run mode is a method of running a sheet where transfer and fixation is done once on the identical surface of the sheet P. The predetermined value (X1) concerning the one surface (the first surface) is less than the predetermined value (X2) concerning the other surface (the second surface).

The controller 11 selects the 2-pass sheet run mode in a case where the basis weight is greater than a predetermined value even with the amount of toner attached being less than the predetermined value. The predetermined value (Y1) concerning the one surface (the first surface) is less than the predetermined value (Y2) concerning the other surface (the second surface).

When the controller 11 selects the 2-pass sheet run mode (the first mode), the spot color image and the color image are separately transferred and fixed onto the identical surface of the sheet P, and when the controller 11 selects the 1-pass sheet run mode (the second mode), the spot color image and the color image are transferred and fixed onto the identical surface of the sheet P at once.

Next, the operation of the image forming apparatus 100 is described.

FIG. 4 is a flow chart of the first image formation mode selection process executed by the image forming apparatus 100. The process is realized by software processing of the controller 11 and the program(s) stored in the storage 12 in corporation thereof.

First, the controller 11 determines whether or not the spot color mode is selected (Step S1). Specifically, the controller 11 determines whether or not a spot color is designated as the color with regard to the target image of image formation in the job information.

If the spot color mode is selected (Step S1; YES), the controller 11 determines whether or not the image is to be formed on the first surface (Step S2). Specifically, the controller 11 determines that the image is to be formed on the first surface if the image is formed on the surface onto which transfer and fixation is done first in the image formation on both surfaces, or if the image is formed just on one surface. The controller 11 determines that the image is not to be formed on the first surface (that the image is to be formed on the second surface) if the image is formed on the surface onto which transfer and fixation is done later in the image formation on both surfaces.

If the image is formed on the first surface (Step S2; YES), the controller 11 determines whether or not the basis weight is greater than Y1 (Step S3). Specifically, the controller 11 obtains the basis weight on the basis of the type of the sheet P designated in the job information or the sheet feeding tray 21 and determines whether or not the obtained basis weight is greater than Y1. For example, the controller 11 obtains the basis weight indicated by the type of the sheet P if the type of the sheet P designated in the job information. In the storage 12, the types (sheet type, size, basis weight, etc.) of the sheet P set in the sheet P is stored associated to each of the sheet feeding trays 21, and the controller 11 obtains, if the sheet feeding tray 21 is designated in the job information, the basis weight associated to the designated sheet feeding tray 21.

If the basis weight is equal to or less than Y1 (Step S3; NO), the controller 11 determines whether or not the amount of spot color toner attached is greater than X1 (Step S4). Specifically, the controller 11 calculates the amount of spot color toner attached on the basis of the density of the spot color designated in the job information and the solid density setting predetermined for the image forming apparatus 100 and compares the amount with X1.

If the basis weight is greater than Y1 at Step S3 (Step S3; YES) or if the amount of spot color toner attached is greater than X1 at Step S4 (Step S4; YES), the controller 11 selects the 2-pass sheet run (Step S5). That is, the controller 11 selects the 2-pass sheet run mode for the first surface if the condition "the basis weight>Y1 or the amount of spot color toner attached>X1" is satisfied.

In the 2-pass sheet run, the controller 11 controls the image former 1W to form the spot color image (white image) on the intermediate transfer belt 7, the secondary transfer roller 8 to transfer the spot color image onto the first surface of the sheet P from the intermediate transfer belt 7, and the fixing unit 9 to fix the spot color image (Step S6).

Next, the controller 11 controls the sheet conveyor 20 to refeed the sheet P on the loop path R3 without changing the surface on which the image is formed. Then, the controller 11 controls the image formers 1Y, 1M, 1C, and 1K to form the color image on the intermediate transfer belt 7, the secondary transfer roller 8 to transfer the color image onto the first surface (the identical surface) of the sheet P from the intermediate transfer belt 7, and the fixing unit 9 to fix the color image (Step S7).

Here, with regard to the order of the image formation on the first surface, the color image may be transferred and fixed first and the spot color image later.

If the amount of spot color toner attached is equal to or less than X1 at Step S4 (Step S4; NO), the controller 11 selects the 1-pass sheet run mode (Step S8). That is, the controller 11 selects the 1-pass sheet run mode for the first surface if the condition "the basis weight>Y1 or the amount of spot color toner attached>X1" is not satisfied.

In the 1-pass sheet run, the controller 11 controls the image formers 1Y, 1M, 1C, 1K, and 1W to form the spot color image (white image) and the color image on the intermediate transfer belt 7, the secondary transfer roller 8 to transfer the spot color image and the color image onto the first surface of the sheet P from the intermediate transfer belt 7, and the fixing unit 9 to fix the spot color image and the color image (Step S9).

If the image is not to be formed on the first surface at Step S2 (Step S2; NO), or if the image is to be formed on the second surface, the controller 11 determines whether or not the basis weight is larger than Y2 (Step S10).

If the basis weight is equal to or less than Y2 (Step S10; NO), the controller 11 determines whether or not the amount of spot color toner attached is larger than X2 (Step S11).

If the basis weight is larger than Y2 at Step S10 (Step S10; YES), or if the amount of spot color toner attached is larger than X2 at Step S11 (Step S11; YES), the controller 11 selects the 2-pass sheet run mode (Step S12). That is, the controller 11 selects the 2-pass sheet run mode for the second surface if the condition that "the basis weight>Y2 or the amount of spot color toner attached>X2" is satisfied.

After the spot color image is transferred and fixed onto the second surface of the sheet P (Step S13), the sheet P is refed on the loop path R3, and the color image is transferred and fixed onto the second surface (the identical surface), under the control of the controller 11 (Step S14).

Here, the color image may be transferred and fixed first and the spot color image later, concerning the order of the image formation on the second surface.

If the amount of spot color toner attached is equal to or less than X2 at Step S11 (Step S11; NO), the controller 11 selects the 1-pass sheet run mode (Step S15). That is, the controller 11 selects the 1-pass sheet run mode for the second surface if the condition that "the basis weight>Y2 or the amount of spot color toner attached>X2" is not satisfied.

The spot color image and the color image are formed at once onto the second surface of the sheet P under the control of the controller 11 (Step S16).

If the spot color mode is not selected at Step S1 (Step S1; NO), the controller 11 selects the 1-pass sheet run mode (Step S17).

The controller 11 controls the image formers 1Y, 1M, 1C, and 1K to form the color image on the intermediate transfer belt 7, the secondary transfer roller 8 to transfer the color image on the sheet P from the intermediate transfer belt 7, and the fixing unit 9 to fix the color image (Step S18).

After Step S7, S9, S14, S16, or S18, the first image formation mode selection process is completed.

As described above, in the first embodiment, the conditions different from each other are employed for each surface of the sheet P as the conditions of the type of the sheet P and the amount of toner attached to make a selection between the 2-pass sheet run mode and the 1-pass sheet run mode. This assures the image quality and the fixity and suppresses a deterioration in the productivity in the duplex image formation using a spot color.

Specifically, the 1-pass sheet run is to be employed as long as the basis weight and the amount of toner attached are in the range where the fixity is assured in the 1-pass sheet run. This improves the productivity and is advantageous also in durability and in cost. The 2-pass sheet run is to be employed if the basis weight and the amount of toner attached are in the range where a fixation failure may occur in the 1-pass sheet run, which prevents fixation failures.

In the image formation on the surface onto which transfer and fixation is done later (the second surface), the temperature of the sheet P has got higher by fixation onto the surface onto which transfer and fixation is done first (the first surface). Thus, the threshold X2 of the amount of spot color toner attached onto the second surface is larger than the threshold X1 of the amount of spot color toner attached onto the first surface. Therefore, the 2-pass sheet run mode and the 1-pass sheet run mode may be selected according to the conditions respectively appropriate for the first surface and the second surface.

In the range of the amount of spot color toner attached and the basis weight where the evaluation is "Δ (triangle)" or "X (cross)" for the first surface (see FIG. 3A) and "O (circle)" for the second surface (see FIG. 3B) (X1<the amount of spot color toner attached=<X2 and Y1<the basis weight<=Y2), the 2-pass sheet run is to be employed for the first surface and the 1-pass sheet run for the second surface, in particular. This assures the image quality and the fixity and suppresses a deterioration in the productivity in the duplex image formation.

In the first embodiment, the thresholds (Y1, Y2, X1, X2) of the basis weight and the amount of spot color toner attached are provided to make a selection between the 2-pass sheet run mode and the 1-pass sheet run mode. Alternatively, the boundary for making a selection between the 2-pass sheet run mode and the 1-pass sheet run as shown in FIGS. 3A and 3B may be curved.

In the first embodiment, the amount of spot color toner (white toner) attached is employed as the amount of toner attached for making a selection between the 2-pass sheet run mode and the 1-pass sheet run mode. Alternatively, the maximum amount of white toner and YMCK toner attached on the sheet P at the time of fixation may be employed for making a selection between the 2-pass sheet run mode and the 1-pass sheet run mode.

As for the color image, the amount of toner attached varies according to the pattern of the image, and thus it is difficult to make a selection between the 2-pass sheet run mode and the 1-pass sheet run mode on the basis of the image data accordingly. Therefore, the amount of white toner attached, which does not usually vary in one job, is employed to facilitate the process.

The amount of white toner is determined by the user in some cases, but may be varied according to the color (brightness) of the sheet P, as disclosed in Japanese Patent Application Laid-Open Publication No. 2017-182032.

In the first embodiment, the basis weight is employed as the sheet type of the sheet P for making a selection between the 2-pass sheet run and the 1-pass sheet run. However, the condition which is required for fixation in the 1-pass sheet run differs according to the sheet type, color, etc. of the sheet P. Therefore, such parameters (sheet type, color, etc.) may be used to make a selection between the 2-pass sheet run mode and the 1-pass sheet run mode.

The 1-pass sheet run may be employed for both the first surface and the second surface if the fixity is more than adequate depending on the type of the sheet P, the image (amount of toner attached), etc., and the 2-pass sheet run may be employed for both the first surface and the second surface if the fixity is inadequate.

In a case where the amount of toner attached on the first surface is small and the amount of toner attached on the second surface is large for some sheet P, the 1-pass sheet run may be employed for the first surface and the 2-pass sheet run may be employed for the second surface.

Second Embodiment

Next, the second embodiment of the present invention is described.

The image forming apparatus in the second embodiment is configured similarly to the image forming apparatus 100 in the first embodiment. Thus, descriptions of the same components as in the first embodiment are omitted, and descriptions of the configuration and process characteristic to the second embodiment are made hereinbelow, with reference to FIGS. 1 and 2.

The control over the sheet conveyance may be complex if the 1-pass sheet run or the 2-pass sheet run is selected for page by page according to the basis weight and the amount of toner attached as in the first embodiment. Thus, in the second embodiment, the image formation on the first surface is done in the 2-pass sheet run mode, and the image formation on the second surface is done in the 1-pass sheet run mode for simplification of the conveyance control.

In the image formation on both surfaces of the sheet P, the number of times of transfer and fixation onto one surface of the sheet P is two or more predetermined times, and the number of times of transfer and fixation onto the other surface of the sheet P after that is less than the predetermined times, under the control of the controller 11. The "predetermined times" is twice and the "number of times less than the predetermined times" is once, for example, also in the second embodiment.

Under the control of the controller 11, the spot color image and the color image are separately transferred and fixed onto one surface and the spot color image and the color image are transferred and fixed onto the other surface at once.

The operation interface 14 is used when the user designate the order in which the spot color image and the color image are transferred and fixed onto the first surface onto which the spot color image and the color image are separately transferred and fixed. That is, the operation interface 14 functions as a designating unit. The controller 11 stores the designated order in the storage 12.

If the spot color image is designated as being first in the order, the spot color image is transferred onto the first surface, and after that, the color image is transferred and fixed onto the first surface according to the designated order, under the control of the controller 11.

If the color image is designated as being first in the order, the color image is transferred and fixed onto the first surface, and after that, the spot color image is transferred and fixed onto the first surface, under the control of the controller 11.

Next, the operation of the image forming apparatus in the second embodiment is described.

FIG. 5 is a flow chart of the second image formation mode selection process executed by the image forming apparatus in the second embodiment. The process is realized by software processing of the controller 11 and the program(s) stored in the storage 12 in corporation thereof.

First, the controller 11 determines whether or not the spot color mode is selected (Step S21).

If the spot color mode is selected (Step S21; YES), the controller 11 determines whether or not the image is to be formed on the first surface (Step S22).

The process of Steps S21 and S22 is similar to that of Steps S1 and S2 in the first image formation mode selection process (see FIG. 4).

If the image is to be formed on the first surface (Step S22; YES), the controller 11 determines the 2-pass sheet run mode (Step S23).

The controller 11 reads out the order designated by the user from the storage 12, and determines whether or not the spot color image is designated as being first in the order according to the designated order (Step S24).

If the spot color image is designated as being first in the order (Step S24; YES), the spot color image is transferred and fixed onto the first surface of the sheet P (Step S25), and, after the sheet P is refed on the loop path R3, the color image is transferred and fixed onto the first surface (the identical surface) (Step S26), under the control of the controller 11.

If the color image is designated as being first in the order at Step S24 (Step S24; NO), the color image is transferred and fixed onto the first surface of the sheet P (Step S27), and, after the sheet P is refed on the loop path R3, the spot color image is transferred and fixed onto the first surface (the identical surface) (Step S28), under the control of the controller 11.

If the image is not to be formed on the first surface at Step S22 (Step S22; NO), or the image is to be formed on the second surface, the controller 11 selects the 1-pass sheet run mode (Step S29).

The spot color image and the color image are transferred and fixed at once onto the second surface of the sheet P (Step S30), under the control of the controller 11.

If the spot color mode is not selected at Step S21 (Step S21; NO), the controller 11 selects the 1-pass sheet run mode (Step S31).

The color image is transferred and fixed onto the sheet P under the control of the controller 11 (Step S32).

After Step S26, S28, S30, or S32, the second image formation mode selection process is completed.

As described above, in the second embodiment, transfer and fixation is done onto the first surface of the sheet P twice, and after that, transfer and fixation is done onto the second surface once. This assures the image quality and the fixity and suppresses a deterioration in the productivity in the duplex image formation using a spot color.

In the image formation on the second surface of the sheet P, the sheet P has passed through the fixing unit 9 in the image formation on the first surface and has been heated, which increases the fixity. Thus, the spot color image and the color image may be formed in the 1-pass sheet run mode.

The conditions of fixation on each of the first and the second surfaces may be changed so as to optimize the fixity on the first and the second surfaces. The conditions of fixation include the fixation nip width, the fixation speed, and the fixation temperature, for example.

In the second embodiment, the 2-pass sheet run is employed for the first surface, and the 1-pass sheet run is employed for the second surface. However, the 2-pass sheet run may be employed for the second surface in a case where the basis weight is larger than the predetermined value (for example, Y2 in FIG. 3B). Similarly, the 2-pass sheet run may be employed for the second surface in a case where the amount of spot color toner attached is larger than the predetermined value (for example, X2 in FIG. 3B).

In the second embodiment, in a case where the spot color image is designated as being first in the order, the white image (spot color image) is transferred and fixed onto the first surface, and, after the sheet is refed on the loop path R3, the color image is transferred and fixed onto the first surface. Then, the sheet is turned upside down on the overturn path R4, and the white image and the color image are transferred and fixed onto the second surface at once.

In the continuous sheet conveyance, it is not efficient to operate in the way described above for one sheet by one sheet. Thus, the white image may be formed on the surface of plural sheets continuously, then the color image may be formed on the first surface (the identical surface) of the plural sheets continuously, and then the white image and the color image may be formed on the second surface of the plural sheets continuously.

In that case, the order in which the sheets are conveyed is to be determined so that the same kinds of images are formed continuously as much as possible. That may facilitate the suspension of the operation of the image former 1W in a case where only the color image is formed, or the suspension of the operation of the image formers 1Y, 1M, 1C, and 1K in a case where only the white image is formed.

Third Embodiment

Next, the third embodiment of the present invention is described.

The image forming apparatus in the third embodiment is configured similarly to the image forming apparatus 100 in the first embodiment. Thus, descriptions of the same components as in the first embodiment are omitted, and descriptions of the configuration and process characteristic to the second embodiment are made hereinbelow, with reference to FIGS. 1 and 2.

In the second embodiment, the user designates the order in which the spot color image and the color image are transferred and fixed on the first surface in the 2-pass sheet run. However, in the third embodiment, the order is determined according to the type of the sheet P.

In the image formation on both surfaces of the sheet P, the number of times of transfer and fixation onto one surface of the sheet P is two or more predetermined times, and the number of times of transfer and fixation onto the other surface of the sheet P after that is less than the predetermined times, under the control of the controller 11. The "predetermined times" is twice and the "number of times less than the predetermined times" is once, for example, also in the third embodiment.

Under the control of the controller 11, the spot color image and the color image are separately transferred and fixed onto one surface and the spot color image and the color image are transferred and fixed onto the other surface at once.

The controller 11 determines the order in which the spot color image and the color image are transferred and fixed onto the first surface onto which the spot color image and the color image are separately transferred and fixed according to the type of the sheet P (recording material).

The controller 11 determines the order depending on whether the sheet P is a colored sheet or a transparent sheet, for example.

If the sheet P is a colored sheet, the spot color image is transferred and fixed onto the first surface, and then, the color image is transferred and fixed onto the first surface, under the control of the controller 11.

If the sheet P is a transparent sheet, the color image is transferred and fixed onto the first surface, and then, the spot color image is transferred and fixed onto the first surface.

Next, the operation of the image forming apparatus in the third embodiment is described.

FIG. 6 is a flow chart of the third image formation mode selection process executed by the image forming apparatus in the third embodiment. The process is realized by software processing of the controller 11 and the program(s) stored in the storage 12 in corporation thereof.

The process at Steps S41 to S43, S49 to S52 is similar to the second image formation mode selection process (see FIG. 5) at Steps at S21 to S23, S29 to S32, and descriptions thereof are omitted.

After Step S43, the controller 11 determines whether or not the sheet P on which the image is formed is a colored sheet or a transparent sheet (Step S44). Specifically, the controller 11 obtains the type of the sheet P included in the job information and determines whether the type of the sheet P obtained is a colored sheet or a transparent sheet. Alternatively, there may be provided a means to automatically assess the type of the sheet P by detection of the type or the transparency of the sheet P. The controller 11 may also obtain the type of the sheet P which is selected by the user via the operation interface 14 and stored in the storage 12.

If the sheet P is a colored sheet (Step S44; colored sheet), the spot color image is transferred and fixed onto the first surface of the sheet P (Step S45), and, after the sheet P is refed on the loop path R3, the color image is transferred and fixed onto the first surface (the identical surface) (Step S46), under the control of the controller 11.

If the sheet P is a transparent sheet at Step S44 (Step S44; transparent sheet), the color image is transferred and fixed onto the first surface of the sheet P (Step S47), and then the sheet P is refed on the loop path R3, the spot color image is transferred and fixed onto the first surface (the identical surface) (Step S48), under the control of the controller 11.

After Step S46, S48, S50, or S52, the third image formation mode selection process is completed.

As described above, in the third embodiment, transfer and fixation is done onto the first surface of the sheet P twice, and then transfer and fixation is done onto the second surface once. This assures the image quality and the fixity and suppresses a deterioration in the productivity in the duplex image formation using a spot color.

The order in which the spot color image and the color image are transferred and fixed onto the first surface in the 2-pass sheet run can be determined according to the type of the sheet P. For example, the order of the images to be layered may be changed according to the use of the white toner for each type of the sheet P.

Specifically, as the color image is formed after the white image has been formed on a colored sheet, coloring of the color image is improved, and the color of the colored sheet may be prevented from affecting the coloring of the color image.

As the white image is formed after the color image has been formed on a transparent sheet, the image quality viewed from the side on which the image is not formed may be improved.

Fourth Embodiment

Next, the fourth embodiment of the present invention is described.

The image forming apparatus in the fourth embodiment is configured similarly to the image forming apparatus 100 in the first embodiment. Thus, descriptions of the same components as in the first embodiment are omitted, and descriptions of the configuration and process characteristic to the fourth embodiment are made hereinbelow, with reference to FIGS. 1 and 2.

In the fourth embodiment, the order in which the spot color image and the color image are transferred and fixed on the first surface in the 2-pass sheet run is determined according to the type of the spot color.

The image forming apparatus in the fourth embodiment includes, as the image former 1W (spot color image former), an image former that forms the white image with a white toner or an image former that forms the transparent image with a transparent toner. The transparent toner is mainly used to adjust a gloss of the color image.

In the image formation on both surfaces of the sheet P, the number of times of transfer and fixation onto one surface of the sheet P is two or more predetermined times, and the number of times of transfer and fixation onto the other surface of the sheet P is less than the predetermined times, under the control of the controller 11. The "predetermined times" is twice and the "number of times less than the predetermined times" is once, for example, also in the fourth embodiment.

Under the control of the controller 11, the spot color image and the color image are separately transferred and fixed onto one surface, and the spot color image and the color image are transferred and fixed onto the other surface at once.

The controller 11 determines the order in which the spot color image and the color image are transferred and fixed onto the first surface onto which the spot color image and the color image are separately fixed and transferred according to the type of the spot color for the image former 1W (spot color image former).

Specifically, the controller 11 determines the order depending on whether the white toner or the transparent toner is used as the spot color toner.

If the white toner is used, the color image is transferred and fixed onto the first surface after the spot color image is transferred and fixed onto the first surface, under the control of the controller 11.

If the transparent toner is used, the spot color image is transferred and fixed onto the first surface after the color image is transferred and fixed onto the first surface, under the control of the controller 11.

Next, the operation of the image forming apparatus in the fourth embodiment is described.

FIG. 7 is a flow chart of the fourth image formation mode selection process executed by the image forming apparatus in the fourth embodiment. The process is realized by software processing of the controller 11 and the program(s) stored in the storage 12 in corporation thereof.

The process at Steps S61 to S63, S69 to S72 is similar to the second image formation mode selection process (see FIG. 5) at Steps at S21 to S23, S29 to S32, and descriptions thereof are omitted.

After Step S63, the controller 11 determines whether the image former 1W to form the spot color image uses the white toner or the transparent toner (Step S64). There may be provided a means to automatically detect the type of the spot color by reading the identification information (barcode, etc.) on the toner bottle, for example. Alternatively, the controller 11 may obtain the type of the spot color selected by the user via the operation interface 14 and stored in the storage 12.

If the image former 1W uses the white toner (Step S64; white toner), the spot color image (white image) is transferred and fixed onto the first surface of the sheet P (Step S65), and then, after the sheet P is refed on the loop path R3, the color image is transferred and fixed onto the first surface (the identical surface) (Step S66), under the control of the controller 11.

If the image former 1W uses the transparent toner at Step S64 (Step S64; transparent toner), the color image is transferred and fixed onto the first surface of the sheet P (Step S67), and then, after the sheet P is refed on the loop path R3, the spot color image (transparent image) is transferred and fixed onto the first surface (the identical surface), under the control of the controller 11 (Step S68).

After Step S66, S68, S70, or S72, the fourth image formation mode selection process is completed.

As described above, in the fourth embodiment, transfer and fixation onto the first surface of the sheet P is done twice, and then transfer and fixation onto the second surface is done once. This assures the image quality and the fixity and suppresses a deterioration in the productivity in the duplex image formation using a spot color.

The order in which the spot color image and the color image are transferred and fixed onto the first surface in the 2-pass sheet run may be determined according to the type of the spot color.

Specifically, if the spot color is white color, the color image is formed after the white image has been formed. This may improve coloring of the color image, and eventually, improve the image quality.

If the spot color is transparent, a gloss may be added to the color image as the transparent image is formed after the color image has been formed.

In a case where the image forming apparatus includes plural spot color image formers, the order in which the spot color image and the color image are transferred and fixed in the 2-pass sheet run may be determined according to the type of the spot color concerning the spot color image former to be used in the job to be done.

In the fourth embodiment, the order in which the spot color image and the color image are transferred and fixed onto the first surface is determined according to the type of the spot color. Alternatively, the order in which the spot color image and the color image are transferred and fixed onto the first surface may be determined depending on a combination of the type of the spot color and the type of the sheet P.

The descriptions in the embodiments described above are merely examples of the image forming apparatus according to the present invention, and the scope of the present invention is not limited thereto. The detailed configurations and the operations of the components of the apparatus may be suitably modified without departing from the scope of the present invention.

For example, the processes of the embodiments described above may be combined.

In the embodiments described above, as for the number of times of transfer and fixation onto one surface of the sheet P, the "predetermined times" is twice, the "number of times less than the predetermined times" is once. However, the "predetermined times" is not limited to twice, but it may be thrice or more. In particular, in a case where the number of the image formers to form images not in the spot color is increased, the "predetermined number of times" may be three or four times.

The order in which the spot color image and the color image are separately transferred and fixed onto the surface (for which the 2-pass sheet run is employed) may be designated by the user in the first embodiment. Specifically, it may be done similarly to Steps S24 to S28 in the second image formation mode selection process (see FIG. 5).

The order in which the spot color image and the color image are separately transferred and fixed onto the surface (for which the 2-pass sheet run is employed) may be determined according to the type of the sheet P in the first embodiment. Specifically, it may be done similarly to Steps S44 to S48 in the third image formation mode selection process (see FIG. 6).

The order in which the spot color image and the color image are separately transferred and fixed onto the surface (for which the 2-pass sheet run is employed) may be determined according to the type of the spot color in the first embodiment. Specifically, it may be done similarly to Steps S64 to S68 in the fourth image formation mode selection process (see FIG. 7). The order of the spot color image and the color image may be determined depending on the combination of the type of the spot color and the type of the sheet P.

In the embodiments described above, the single transfer unit that perform transfer onto the sheet P (secondary transfer roller 8) and the single fixing unit 9 are provided. However, in the apparatus with plural transfer units and fixing units being disposed alongside in the sheet conveyance direction, the transfer unit and the fixing unit may be different for each transfer and fixation.

The tone of color may be varied between the 2-pass sheet run where the spot color image and the color image are separately formed and the 1-pass sheet run where the spot color image and the color image are formed at once due to color mingling at the time of fixation. Thus, the color varied between the 2-pass sheet run and the 1-pass sheet run may be adjusted with the density of the color image.

In the embodiments disclosed above, a semiconductor memory or an HDD is used as a computer-readable medium storing the programs for executing various kinds of processing, though not limitative. A portable recording/storage medium such as a CD-ROM may be used as an alternative computer-readable medium. Further, as a medium to provide data of the programs via communication network, a carrier wave may be used.

Although embodiments of the present invention have been described and illustrated in detail, the disclosed embodiments are made for purposes of illustration and example only and not limitation. The scope of the present invention should be interpreted by terms of the appended claims The entire disclosure of Japanese Patent Application No. 2018-202398, filed on Oct. 29, 2018, is incorporated herein by reference in its entirety.

What is claimed is:

1. An image forming apparatus comprising:
a color image former that forms a color image with a plurality of process color toners in different colors;
a spot color image former that forms a spot color image with a spot color toner in a spot color different from any of the colors of the plurality of process color toners;
a transfer unit that transfers the formed color image and the formed spot color image onto a recording material;
a fixing unit that fixes the transferred color image and the transferred spot color image onto the recording material; and
a hardware processor that selects a first mode or a second mode depending on whether or not a type of the recording material and an amount of toner to be attached onto the recording material satisfy a predetermined condition,
wherein the number of times of image transfer and fixation onto an identical surface of the recording material is two or more predetermined times in the first mode,
wherein the number of times of image transfer and fixation onto the identical surface of the recording material is less than the predetermined times in the second mode,
wherein when images are formed on both surfaces of the recording material, the predetermined condition differs between a first surface and a second surface of the recording material.

2. The image forming apparatus according to claim 1,
wherein the hardware processor selects the first mode when the amount of toner to be attached is greater than a predetermined value, and selects the second mode when the amount of toner to be attached is equal to or less than the predetermined value,
wherein image transfer and fixation on the first surface is done first,
wherein image transfer and fixation on the second surface is done later,
wherein the predetermined value is less on the first surface than on the second surface.

3. The image forming apparatus according to claim 1,
wherein the hardware processor causes the spot color image and the color image to be transferred and fixed separately onto an identical surface of the recording material in the first mode,
wherein the hardware processor causes the spot color image and the color image to be transferred and fixed at once onto the identical surface in the second mode.

4. The image forming apparatus according to claim 3,
wherein, when the spot color image and the color image are separately transferred and fixed, the spot color image is transferred and fixed first and then the color image is transferred and fixed.

5. The image forming apparatus according to claim 3, wherein, when the spot color image and the color image are separately transferred and fixed, the color image is transferred and fixed first, and then the spot color image is transferred and fixed.

6. The image forming apparatus according to claim 3, comprising:
a designating unit that designates an order in which the spot color image and the color image are transferred and fixed when the spot color image and the color image are separately transferred and fixed.

7. The image forming apparatus according to claim 3, wherein when the spot color image and the color image are separately transferred and fixed, the hardware processor determines an order in which the spot color image and the color image are transferred and fixed according to a type of the recording material.

8. The image forming apparatus according to claim 3, wherein when the spot color image and the color image are separately transferred and fixed, the hardware processor determines an order in which the spot color image and the color image are transferred and fixed according to a type of the spot color concerning the spot color image former.

9. An image forming apparatus comprising:
a color image former that forms a color image with a plurality of process color toners in different colors;
a spot color image former that forms a spot color image with a spot color toner in a spot color different from any of the colors of the plurality of process color toners;
a transfer unit that transfers the formed color image and the formed spot color image onto a recording material;
a fixing unit that fixes the transferred color image and the transferred spot color image onto the recording material; and
a hardware processor that, when images are formed on both surfaces of the recording material, causes the spot color image and the color image to be transferred and fixed such that the number of times of image transfer and fixation onto a first surface of the recording material is two or more predetermined times, and that the number of times of image transfer and fixation onto a second surface of the recording material is less than the predetermined times.

10. The image forming apparatus according to claim 9, wherein the hardware processor causes the spot color image and the color image to be transferred and fixed separately onto the first surface of the recording material,
wherein the hardware processor causes the spot color image and the color image to be transferred and fixed at once on the second surface of the recording material.

11. The image forming apparatus according to claim 10, wherein, when the spot color image and the color image are separately transferred and fixed, the spot color image is transferred and fixed first, and then the color image is transferred and fixed.

12. The image forming apparatus according to claim 10, wherein, when the spot color image and the color image are separately transferred and fixed, the color image is transferred and fixed first and then the spot color image is transferred and fixed.

13. The image forming apparatus according to claim 10, comprising:
a designating unit that designates an order in which the spot color image and the color image are transferred and fixed when the spot color image and the color image are separately transferred and fixed.

14. The image forming apparatus according to claim 10, wherein when the spot color image and the color image are separately transferred and fixed, the hardware processor determines an order in which the spot color image and the color image are transferred and fixed according to a type of the recording material.

15. The image forming apparatus according to claim 10, wherein when the spot color image and the color image are separately transferred and fixed, the hardware processor determines an order in which the spot color image and the color image are transferred and fixed according to a type of the spot color concerning the spot color image former.

* * * * *